(12) United States Patent
Sakai (10) Patent No.: US 7,361,250 B2
(45) Date of Patent: Apr. 22, 2008

(54) PRISM, METHOD OF PRODUCING A PRISM, AND OPTICAL HEAD APPARATUS USING A PRISM

(75) Inventor: Hiroshi Sakai, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 358 days.

(21) Appl. No.: 10/988,376

(22) Filed: Nov. 12, 2004

(65) Prior Publication Data

US 2005/0128608 A1 Jun. 16, 2005

(30) Foreign Application Priority Data

Nov. 12, 2003 (JP) ............................ 2003-382090

(51) Int. Cl.
*B32B 31/00* (2006.01)
*G02B 5/04* (2006.01)
(52) U.S. Cl. ...................................... 156/260; 359/833
(58) Field of Classification Search ................. 359/833; 156/260
See application file for complete search history.

(56) References Cited

U.S. PATENT DOCUMENTS 6,411,449 B1 * 6/2002 Hashizume et al. ........ 359/831

2001/0006504 A1 * 7/2001 Morimoto et al. ..... 369/112.21
2002/0026981 A1 * 3/2002 Fukushima .................. 156/264

FOREIGN PATENT DOCUMENTS

| JP | 05-066303 | * 3/1993 | ............ 369/112.21 |
|---|---|---|---|
| JP | 2000-143264 | 5/2000 | |

* cited by examiner

*Primary Examiner*—Richard Crispino
*Assistant Examiner*—Emily A Chimiak
(74) *Attorney, Agent, or Firm*—Reed Smith LLP

(57) ABSTRACT

A method of producing a prism comprising a first prism component and a second prism component that are joined together along a partial reflection plane that is inclined with respect to the optical axis. The method has steps comprising measuring the refractive index for multiple base materials constructing the first prism component and the second prism component and joining the base materials having approximately the same refractive index measurements together along a partial reflection plane in such a manner that the refractive index measurements are associated with specified positions during the course of joining.

3 Claims, 7 Drawing Sheets

ized that even when the first and second prism components 41 and 42 are made from the same material, some manufacturing lots or combinations of prism components generate astigmatism at a level beyond tolerance. In other words, attention to the production history can keep astigmatism at a low level, but the presence of a difference in refractive index between first prism component 41 and second prism component 42 leads to the generation of different optical path lengths of in prism 4. In addition, if the numerical apertures or NAs thereof are identical, the amount of astigmatism is directly proportional to the level of the difference in refractive index. Therefore, prism 4 should be made by using the base materials having the same or approximately the same refractive index.

PRISM, METHOD OF PRODUCING A PRISM, AND OPTICAL HEAD APPARATUS USING A PRISM

CROSS-REFERENCE TO RELATED APPLICATION

This application claims priority of Japanese Application No. 2003-382090, filed Nov. 12, 2003, the complete disclosure of which is hereby incorporated by reference.

BACKGROUND OF THE INVENTION a) Field of the Invention

The present invention relates to a method of producing a prism for use in an optical path synthesizing element or optical path separation element and the like. It also relates to an optical head apparatus that is equipped with a prism.

b) Description of the Related Art

Generally, the optical head apparatus used for recording and reproducing data on an optical data storage medium such as a CD or DVD comprises a laser emitting element, a prism that is entered by a laser beam emitted from a laser emitting element, a collimating lens for collimating the laser beam emitted from a laser emitting element that passes through a prism, and an objective lens for condensing the parallel beams emitted from the collimating lens to an optical data storage medium wherein these components are arranged along the optical path in the order given.

Figure 1:
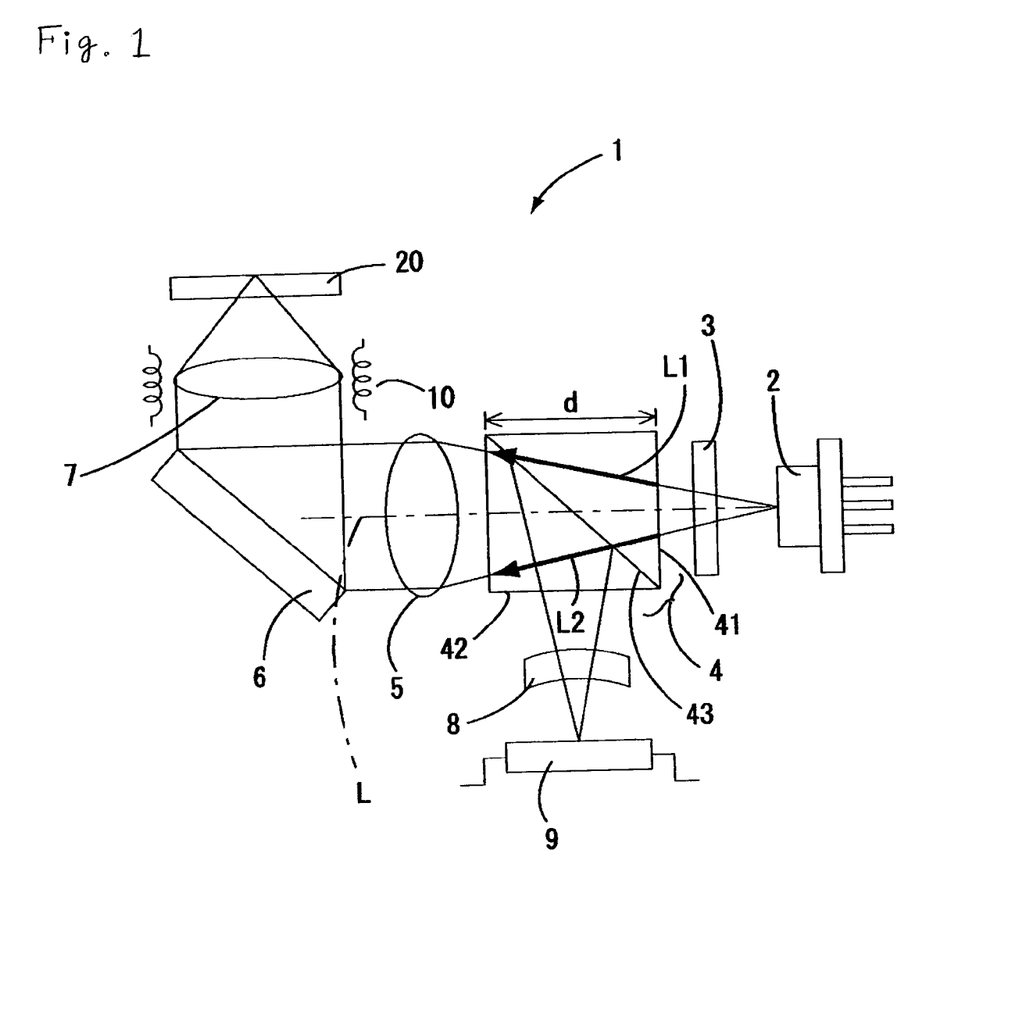
FIG. 1 is a schematic configuration focusing on an optical system of the optical head apparatus of the embodiment of the present invention.

In an optical head apparatus of this type, a prism is used as an optical path synthesizing element or optical path separation element. For example, in the optical system as illustrated in FIG. 1, a prism is used as an optical path separation element: Prism 4 comprises first prism component 41 and second prism component 42 joined together along partial reflection plane 43, which is inclined with respect to the optical axis L of the laser beam emitted from laser emitting element 2. Partial reflection plane 43 transmits the laser beam emitted from laser emitting element 2 to collimating lens 5 while it reflects the light returned by optical data storage medium 20 to light receiving element 9.

DISCLOSURE OF THE INVENTION

Problems to be Solved

In the optical head apparatus thus configured, a laser beam emitted from laser emitting element 2 passes through prism 4 as a bundle of divergent light rays and enters collimating lens 5. If the astigmatism is not controlled correctly, it will not be possible to form a small spot on optical data storage medium 20. Therefore, the objects to be controlled include the use of the same material for first prism component 41 and second prism component 42 that together constitute prism 4, surface accuracy, parallelism, and the like.

Any conventional method of controlling prism 4 could provide a certain desirable reproducibility for relatively low-density optical data storage media such as CDs. However, the use of the above method alone generates astigmatism at a level beyond the tolerance level for high density optical data storage media such as DVDs.

The applicant carefully studied various causes and recognized that even when the first and second prism components 41 and 42 are made from the same material, some manufacturing lots or combinations of prism components generate astigmatism at a level beyond tolerance. In other words, attention to the production history can keep astigmatism at a low level, but the presence of a difference in refractive index between first prism component 41 and second prism component 42 leads to the generation of different optical path lengths of in prism 4. In addition, if the numerical apertures or NAs thereof are identical, the amount of astigmatism is directly proportional to the level of the difference in refractive index. Therefore, prism 4 should be made by using the base materials having the same or approximately the same refractive index.

Nonetheless, the refractive index of commercially available base materials have a tolerance of approximately ±0.0010. If the base materials are used as is, the difference in refractive index between first prism component 41 and second prism component 42 can be within the range of −0.002-0.002 and often exceeds an absolute value of 0.001. Additionally, an astigmatism defined by a positive difference in refractive index generated by first prism component 41 and second prism component 42 can be 90 degrees out of phase with another astigmatism defined by a negative difference in refractive index thereof. Further, the next generation optical disks, which record and reproduce data with a laser diode emitting a so called "blue laser beam" of 405 nm, have a numerical aperture as high as 0.85, which is higher than that of a DVD that records and reproduces data with a laser diode of 650 nm. The next generation optical disk, therefore, is more susceptible to astigmatism than a DVD. For this reason, the difference in refractive index between first prism component 41 and second prism component 42 must be kept to a low level.

OBJECT AND SUMMARY OF THE INVENTION

In view of the above problems, the primary object of the present invention is to provide a method of producing a prism in which it is possible to the difference in refractive index that exists between a first prism component and a control the amount and (algebraic) sign of second prism component that are joined together along a partial reflection plane. Additionally, the present invention provides a prism and an optical head using a prism.

To solve the above problems, the present invention is characterized by a method of producing a prism comprising a first prism component and a second prism component that are joined along a partial reflection plane tilted toward the optical axis wherein the method has steps that comprise: measuring refractive indices for multiple base materials that constitute a first prism component and a second prism component; and joining base materials having approximately the same refractive index measurements together along a partial reflection plane in such a manner that the refractive index measurements are associated with specified positions during the course of joining.

In the present invention, the index of refraction is measured for each base material used in prism construction and base materials having approximately the same refractive index measurements are joined together. Consequently, the refractive index is approximately the same for both the first prism component and the second prism component; therefore, the difference in optical path length is small for a laser beam passing through any point in the prism. Hence, the astigmatism produced by the prism can be kept to a low level. In addition, multiple base materials are arranged in such a manner that the refractive index measurements are associated with specified positions; therefore, it will be known which component or side has a higher refractive index despite any difference in refractive index between the first prism component and second prism component. Consequently, an optical system can be configured according to the direction of the astigmatism generated by the prism. The astigmatism due to the prism can thus be resolved.

To form a plurality of prisms at the same time in the present invention, a laminated body is constructed by joining three or more base materials that are arranged according to the refractive index measurements in an incremental or decremental manner. Then, the laminated body is cut to yield a plurality of prisms.

Another embodiment of the present invention involves a method of producing a prism having a first prism component and a second prism component joined together along a partial reflection plane inclined with respect to the optical axis. This method comprises cutting a large starting base material capable of producing a first prism component and a second prism component into multiple base materials, followed by joining the multiple base materials together along a partial reflection planes.

In the present invention, the refractive index is identical for both a first prism component and a second prism component because the base materials are cut out from the same starting base material to produce prisms. As a result, no difference in optical path length for the divergent laser light will be produced at any point in the prism. Thus, no astigmatism due to the prism is generated.

To produce a plurality of prisms simultaneously in the present invention, the starting base material must be cut into three or more base materials thereof, and then, a laminated body must be formed by joining three or more base materials, followed by cutting the laminated body to obtain a plurality of prisms.

In a prism of the present invention, it is desirable that the difference in refractive index defined by a first prism component and a second prism component satisfies the following inequality:

−0.001<Δn<0.001 where Δn is the difference in refractive index.

The present invention applies to a prism used for an optical path synthesizing element or optical path separation element.

ADVANTAGEOUS EFFECTS OF THE INVENTION

The present invention recognizes the fact that when a laser beam passes through a prism as divergent light, the first ratio defined by the length of the optical path of the first prism component to the entire length of the optical path of the laser beam and the second ratio defined by the length of the optical path of the second prism component to the length of the entire optical path of the laser beam can deviate in accordance with the point of the prism through which the laser beam passes, and the refractive indices of the first prism component and the second prism component can be equalized to produce a prism. Therefore, according to the present invention, the lengths of the optical paths will be identical or the difference in length will be substantially small. Accordingly, astigmatism may be absent or present only at a low level. In this prism, it is known which prism component has a higher refractive index due to the way the prism is made, even when a difference in refractive index exists between the first and second prism components. The direction of the astigmatism generated by a prism is therefore predictable, and an optical system can be configured in the direction of the astigmatism generated by the prism. The problem of the astigmatism generated by the prism is thus resolved.

An example of the optical apparatus of the present invention is described herein with reference to the drawings.

BRIEF DESCRIPTION OF THE DRAWINGS

In the drawings:

FIGS. 3 (a)-(c) are diagrams illustrating a method of producing a prism associated with Embodiment 1 of the present invention;

FIGS. 4 (a)-(g) are diagrams illustrating a method of producing a prism associated with Embodiment 2 of the present invention;

FIGS. 5 (a)-(d) are diagrams illustrating a method of producing a prism associated with Embodiment 3 of the present invention;

FIGS. 6 (a)-(h) are diagrams illustrating a method of producing a prism associated with Embodiment 4 of the present invention; and FIGS. 7 (a) and (b) are schematic configurations focusing on another optical system of the optical head apparatus.

DESCRIPTION OF THE PREFERRED EMBODIMENTS

Embodiment 1

Figure 2:
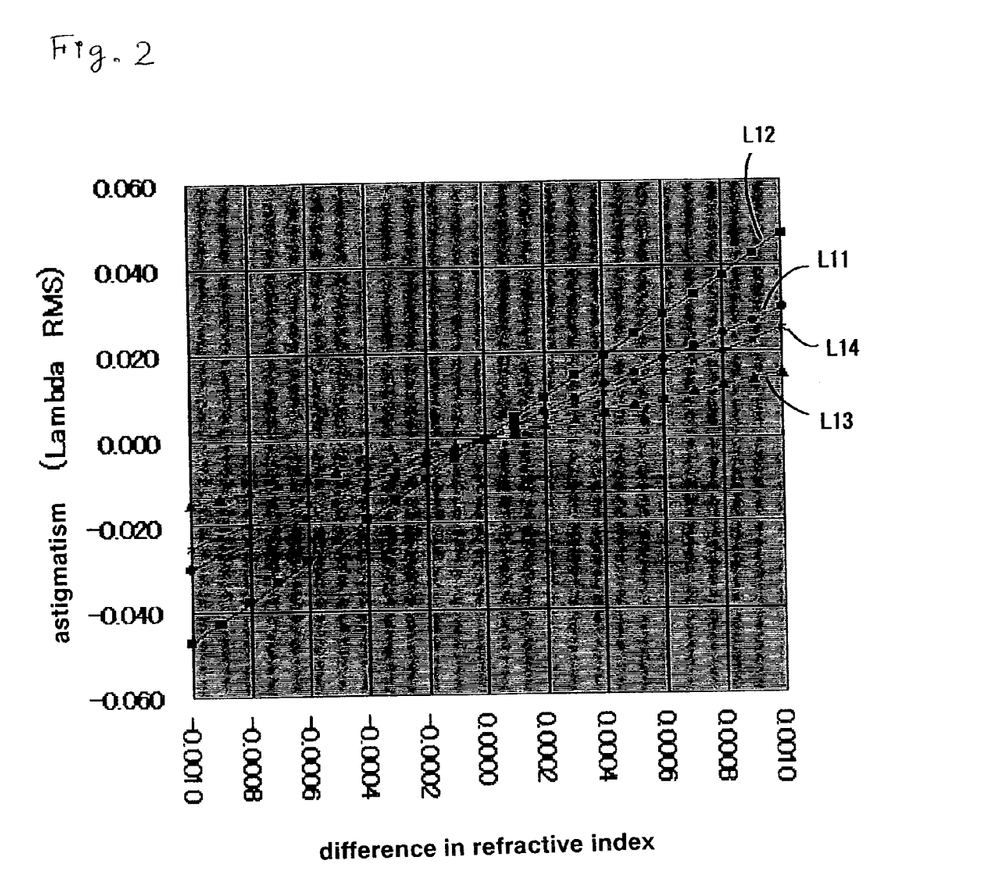
FIG. 2 is a graph illustrating the relationship of the differences in refractive indices generated between prism components with the astigmatisms derived from the prism.

FIG. 1 is a schematic configuration focusing on an optical system of the optical head apparatus of Embodiment 1. FIG. 2 is a graph illustrating the relationship between the difference in refractive index that exists between the first and second prism components constituting a prism and the astigmatism derived from said prism.

Optical head apparatus 1 of FIG. 1 records and reproduces data to and from optical data storage medium 20 such as a DVD. In optical head apparatus 1 are arranged in order along the optical axis: laser emitting element 2 made of a laser diode that emits a laser beam with a wavelength of 650 nm; grating 3 for splitting the beam emitted by laser emitting element 2 into 3 beams; cubic prism 4 for synthesizing or separating the optical path for the laser beam emitted from laser emitting element 2 via grating 3; collimating lens 5 for collimating the laser beam that passes through prism 4; raised mirror 6; and objective lens 7 that condenses a bundle of parallel light beams emitted by raised mirror 6 and collimating lens 5 onto optical data storage medium 20.

Prism 4 is configured in such a manner that triangular first prism component 41 and likewise triangular second prism component 42 are joined together along partial reflection plane 43. The partial reflection plane is inclined to make a 45 degree angle with respect to the optical axis L of the laser beam emitted from laser emitting element 2.

Light receiving element 9 and sensor lens 8 are arranged on one side of prism 4. The light beam reflected by optical data storage medium 20 enters prism 4 via objective lens 7, raised mirror 6, and collimating lens 5. The optical axis L of the beam is turned to make a right angle at partial reflection plane 43 and is guided to sensor lens 8 and light receiving element 9.

The numerical aperture of collimating lens 5 is, for example, approximately 0.13 on the laser emitting element 2 side; and it is, for example, approximately 0.6 on the optical data storage medium 20 side.

Objective lens 7 is provided with lens driving apparatus 10 which drives the lens in the focusing and tracking directions.

(Configuration of Prism 4)

In optical head apparatus 1 thus configured, first prism component 41 and second prism component 42 together constituting prism 4 are made of the same resin or glass material. In this embodiment, prism 4 is made by a method described later such that the difference in refractive index between first prism component 41 and second prism component 42 satisfies the following inequality:

$$-0.001 < \Delta n < 0.001$$

where $\Delta n$ is the difference in refractive index.

The refractive index of first prism component 41 and second prism component 42 must be equalized for the reasons described below: Most optical paths within prism 4 of the (first) light component that take optical path L1 (arrow) in prism 4 have the same length as those of first prism component 41 itself; most optical paths within prism 4 of the (second) light component that take the optical path L2 (arrow) in prism 4 have the same lengths as those of second prism component 42 itself. This means that the presence of a difference in refractive index derived from first prism component 41 and second prism component 42 generates a difference in optical path length depending upon which component the laser beam passes through. Therefore, by equalizing or approximating the refractive index for first prism component 41 and second prism component 42 for a laser beam that passes through prism 4 as a bundle of divergent light rays, no transmitting position-dependent difference in optical path will be generated. If such a position-dependent difference in optical path is generated, the difference will remain substantially at a low level. Accordingly, any astigmatism derived from prism 4 is suppressed, thereby allowing the formation of a small spot on optical data storage medium 20.

The difference in refractive index ($\Delta n$) between first prism component 41 and second prism component 42 must satisfy the following inequality for the reasons described below with reference to FIG. 2:

$$-0.001 < \Delta n < 0.001$$

FIG. 2 illustrates a graph that describes the relationship between astigmatism and difference in refractive index of first prism component 41 and second prism component 42 wherein the length of prism 4 along the optical path of a laser beam and the numerical aperture of collimating lens 5 on the laser emitting element 2 side are varied: In FIG. 2, L11 plots the data obtained from a prism 4 whose length (d) along the optical axis of a laser beam is 4.5 mm and whose numerical aperture (of collimator lens 5) at the laser emitting element 2 side is 0.108; L12 plots the data obtained from a prism 4 whose length (d) along the optical axis of a laser beam is 4.5 mm and whose numerical aperture (of collimator lens 5) at the laser emitting element 2 side is 0.136. Moreover, L13 plots the data obtained from a prism 4 whose length (d) along the optical axis of a laser beam is 3.0 mm and whose numerical aperture (of collimator lens 5) at the laser emitting element 2 side is 0.108; L14 plots the data obtained from a prism 4 whose length (d) along the optical axis of a laser beam is 3.0 mm and whose numerical aperture (of collimator lens 5) at the laser emitting element 2 side is 0.136.

As is apparent from the results illustrated in FIG. 2, an assembled prism 4 can maintain the difference in refractive index ($\Delta n$) between first prism component 41 and second prism component 42 within the range specified by the above inequality, and any astigmatism derived from prism 4 can be substantially suppressed.

Further, in this embodiment, even though there is a difference between the refractive indices of first prism component 41 and second prism component 42, the way in which prism 4 is made defines which prism component has the higher refractive index, and therefore, the direction of the astigmatism generated by prism 4 is predictable. An optical system can thus be configured in the direction of the astigmatism generated by prism 4 to prevent such astigmatism.

In addition, the next generation optical disk that records and reproduces data and which uses a laser diode that emits a so called "blue laser beam" having a wavelength of 405 nm has a numerical aperture (NA) of 0.85, which is larger than that of a DVD that uses a laser diode having a wavelength of 650 nm. For this reason, the next generation optical disk is susceptible to astigmatism and the difference in refractive index between first prism component 41 and second prism component 42 must be kept to a low level. The present embodiment can overcome this challenge and accommodate the next generation optical disk by satisfying the previously described conditions.

(Method 1 of Producing a Prism)

Figure 3:
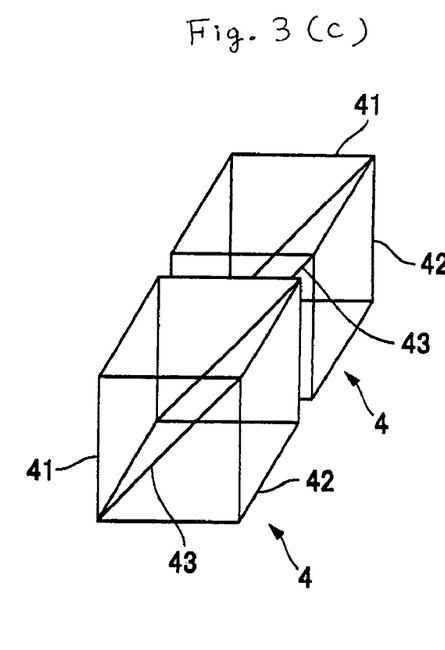

FIGS. 3 (a)-(c) are diagrams illustrating a method of producing a prism associated with Embodiment 1 of the present invention.

In this embodiment, multiple base materials 44 that are transparent right-angled triangular prisms were prepared to construct prism components 41 and 42, and the refractive index was measured for each base material 44.

Then, as illustrated in FIG. 3 (b), base materials 44 having the same refractive index measurement are joined at the slopes of each of base materials 44 along partial reflection plane 43 to form laminated body 440. In this case, base materials 44 should be selected such that they form a complete prism 4 comprising first prism component 41 and second prism component 42 whose difference in refractive index ($\Delta n$) satisfies the inequality below in the same manner that the difference in refractive index between adjacent base materials 45 satisfies the inequality below for laminated body 450:

$$-0.001 < \Delta n < 0.001$$

where $\Delta n$ is the difference in refractive index.

During the course of joining, the two base materials 44 must be arranged such that the refractive index measurements are associated with specified positions. For example, the base material allocated to the first prism component 41 side may have a higher refractive index; the base material allocated to the second prism component 42 side may have a lower refractive index.

Partial reflection plane 43 is produced by uniformly laminating a layer of high refractive index and another layer of low refractive index (e.g. $TiO_2$ layer and a $SiO_2$ layer) over the slope of one side of the two base materials 44 in an alternate manner. The lamination step can be provided before or after the refractive index measurements as long as the two base materials 44 have not been joined together. In either case, partial reflection plane 43 is provided only to one side of the two base materials 44. Further, during the bonding of base materials 44, a layer of UV-curing type adhesive or the like may be formed between the two base materials 44 and then cured.

Next, as illustrated in FIG. 3 (c), laminated body 440 made by adhesively bonding base materials 44 is cut in the elongated direction at specified intervals, thereby yielding a plurality of cubic prisms 4 in which first triangular prism component 41 and second triangular prism component 42 are joined together along partial reflection plane 43.

In this embodiment, as described above, the refractive index is measured for each of the prism base materials 44 and the base materials having the same refractive index measurements are then joined together along partial reflection plane 43 to produce prism 4. Therefore, the refractive indices of first prism component 41 and second prism component 42 are identical and the difference in optical path is small for any bundle of convergent laser light beams passing through any point in prism 5. Accordingly, any astigmatism derived from prism 4 is kept to a low level.

Additionally, because multiple base materials 44 are joined in such a manner that the refractive index measurements are associated with specified positions when base materials 44 are joined, it is known which component has a higher refractive index even though a difference in refractive index exists between first prism component 41 and second prism component 42. An optical system can, therefore, be configured according to the direction in which astigmatism is generated by prism 4. The astigmatism due to prism 4 can thus be resolved.

(Method 2 of Producing a Prism)

FIGS. 4 (a)-(g) are diagrams illustrating a method of producing a prism associated with Embodiment 2 of the present invention.

In this embodiment, as illustrated in FIG. 4 (a), a plurality of transparent base material plates are prepared to construct prism 4.

Figure 4A:
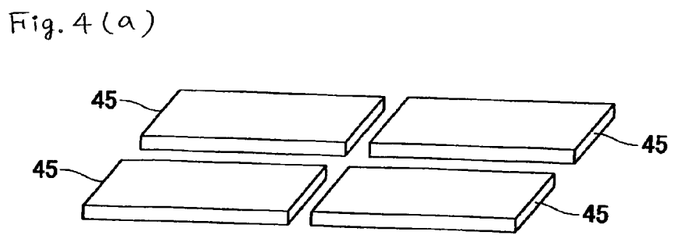
Figure 4B:
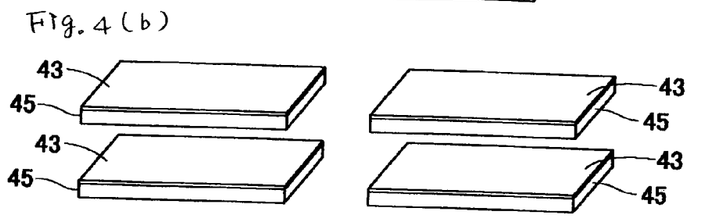

Next, refractive index measurements are taken for each of base materials 45. Before or after the refractive index is measured, partial reflection planes 43 are formed on top of base materials 45 as illustrated in FIG. 4 (b).

Figure 4C:
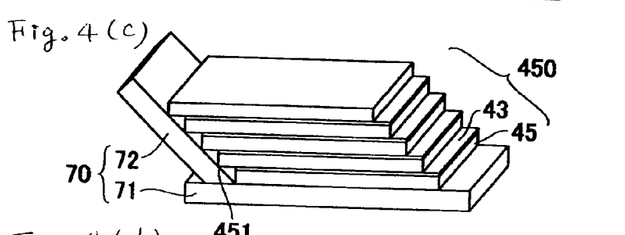
Figure 4D:
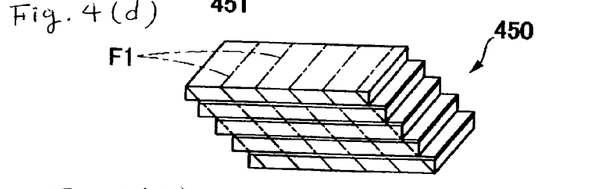
Figure 4E:
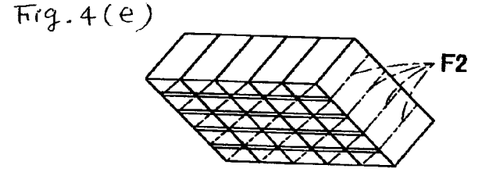
Figure 4F:
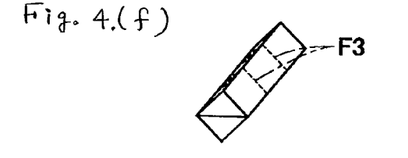

Then, two base materials 45 are joined together via partial reflection plane 43: Base materials 45 are shifted along partial reflection plane 43 at equal intervals using jig 70 as illustrated in FIG. 4 (c), and are laminated. Laminated body 450 is thus configured in steps of 45 degrees. Jig 70 has level base plate 71 and sloping plate 72 which stands upward at one end of base plate 71 at a 45 degree angle. Therefore, by letting base materials 45 touch sloping plate 72 on side 451 of the bottom plane of base materials 45 while laminating base materials 45 onto base plate 71, laminated body 450 is configured in steps of 45 degrees. In addition, UV-curing adhesive is applied between base materials 45 and is irradiated with UV light and laminated body 450 is pressurized during the adhesive curing step. Laminated body 450 can thus form an integrated whole as illustrated in FIG. 4 (d).

In constructing laminated body 450 by the previously described method, base materials 45 having approximately the same refractive index measurements are adjoined together along partial reflection plane 43. In this embodiment, base materials 45 are positioned such that the refractive index measurements are arranged in an incremental or decremental manner to construct laminated body 450. Additionally, base materials 44 should be selected such that they form a complete prism 4 comprising first prism component 41 and second prism component 42 whose difference in refractive index ($\Delta n$) satisfies the inequality below in the same manner that the difference in refractive index between adjacent base materials 45 satisfies the inequality below for laminated body 450:

$$-0.001 < \Delta n < 0.001$$

where $\Delta n$ is the difference in refractive index.

Next, laminated body 450 is cut along F1, the primary plane to be cut as illustrated by a dotted line shown in FIG. 4 (d), followed by cutting along F2, the secondary plane to be cut illustrated by a one dot-dash line as illustrated in FIG. 4 (e). The resulting pieces are further cut along F3, the tertiary plane to be cut, at specified intervals as illustrated in FIG. 4 (f). Hence, a plurality of prisms 4 as illustrated in FIG. 4 (g) are obtained.

Figure 4G:
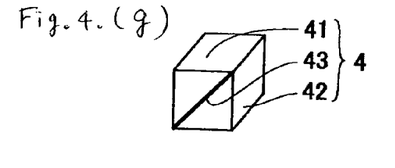

Laminated body 450 is constructed by steps comprising: measuring the refractive index for each base material 45 for prism construction; and arranging base materials having approximately the same refractive index measurement to be adjoined together so as to position the refractive index of base materials 45 in an incremental or decremental manner in this configuration as well. In prism 4 obtained by cutting laminated body 450, therefore, first prism component 41 and second prism component 42 have approximately the same refractive index. This means that the difference in the optical path length is small for the divergent rays of a laser beam that pass through different points in prism 4. Any astigmatism derived from prism 4 is thus kept to a low level.

Additionally, multiple base materials 45 are arranged in such a manner that refractive index measurements are associated As a result, even when a difference in refractive index exists between first prism with (positions being assigned) in a given order component 41 and second prism component 42, it is known which component has a higher refractive index, and an optical system can be configured according to the direction of the astigmatism generated by prism 4. The astigmatism due to prism 4 can thus be resolved.

(Method 3 of Producing a Prism)

FIGS. 5 (a)-(d) are diagrams illustrating a method of producing a prism associated with Embodiment 3 of the present invention.

In this embodiment, as illustrated in FIG. 5 (a), starting base materials 46 of a long transparent right-angled triangular prism configuration are prepared and cut in the elongated direction to produce two base materials having a right-angled triangle prism configuration as illustrated in FIG. 5 (b). Thus, partial reflection plane 43 will be formed along one side of the two base materials 47.

Next, as illustrated in FIG. 5 (c), base materials 47 are arranged such that the sloped planes face each other with partial reflection plane 43 and an adhesive between them. Then, the adhesive is cured to join the sloped planes of base materials 47 together to produce prism 4 in a cubic configuration.

Figure 5A:
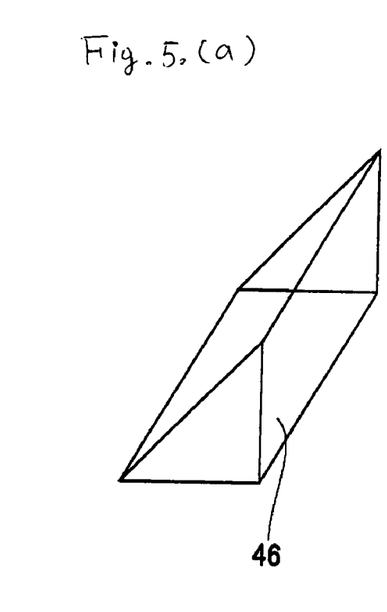
Figure 5B:
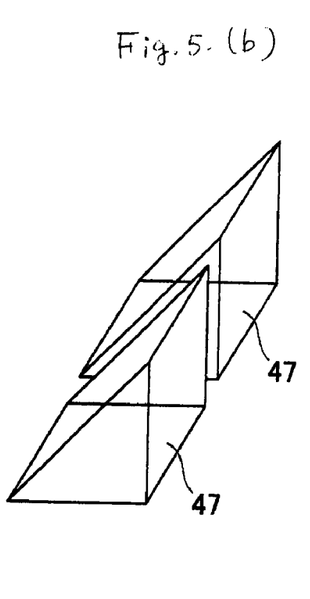
Figure 5C:
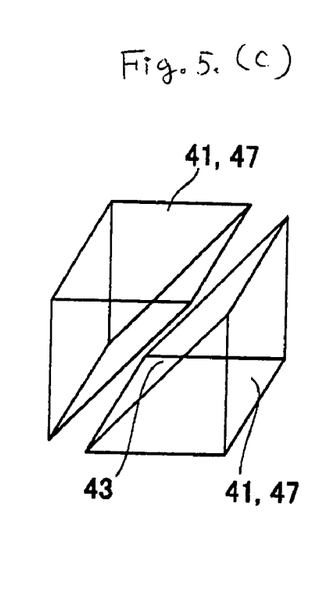
Figure 5D:
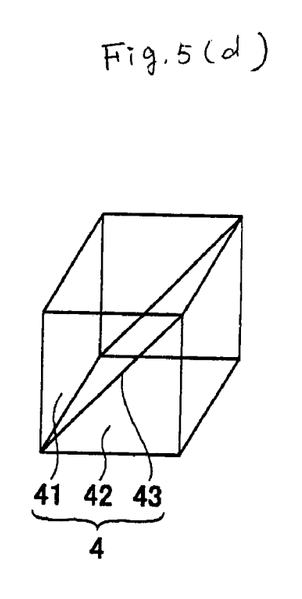

As described above, in this embodiment, the refractive indices of first prism component 51 and second prism component 52 are identical because base materials 47 are cut from the same starting base material 46 and are joined together to produce prism 4. Hence, there will be no difference in the optical path lengths for the divergent rays of a laser beam that travel along different paths in prism 4, and no astigmatism will be induced by prism 4.

(Method 4 of Producing a Prism)

Figure 6:
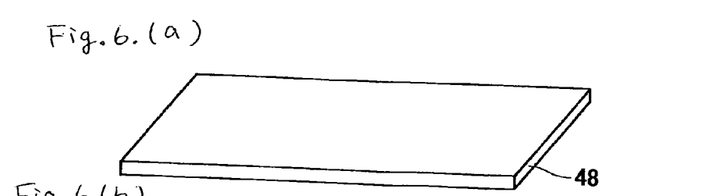

FIGS. 6 (a)-(h) are diagrams illustrating a method of producing a prism associated with Embodiment 4 of the present invention.

In this embodiment, as illustrated in FIG. 6 (a), starting base material 48 which is a large-sized transparent substrate is prepared and cut into three or more pieces to produce base materials 45 as illustrated in FIG. 6 (*b*).

Then, as illustrated in FIG. 6 (*c*), partial reflection plane 43 is formed on top of base materials 45. Note that partial reflection plane 43 may also be formed on starting base material 48.

Next, base materials 45 are joined together along partial reflection plane 43 to produce laminated body 450 as illustrated in FIG. 6 (*d*). This is done in the same manner as in Embodiment 2: base materials 45 are shifted along the plane formed by partial reflection plane 43 at even intervals using jig 70 as illustrated in FIG. 4 (*d*), to laminate them through adhesive bonding to produce laminated body 450.

Next, laminated body 450 is cut along F1, these primary planes to be cut are illustrated by dotted lines in FIG. 6 (*e*). This is followed by cutting the resulting pieces along F2, where these secondary planes to be cut are illustrated by one dot-dash lines as shown in FIG. 6 (*f*). Then, the resulting pieces are further cut along F3, these tertiary planes to be cut, at specified intervals as illustrated in FIG. 6 (*g*). Hence, a plurality of prisms 4 as illustrated in FIG. 4 (*h*) are obtained.

In this embodiment, prism 4 is produced by joining base materials 45 cut out from an identical starting base material 48 in the same manner as Embodiment 3. Accordingly, the refractive index is identical for both first prism component 51 and second prism component 52 and no difference in optical path lengths will be generated for divergent light rays that pass along different paths in prism 4. In this way, no astigmatism will be induced by prism 4.

ALTERNATIVE EMBODIMENT

Figure 7:
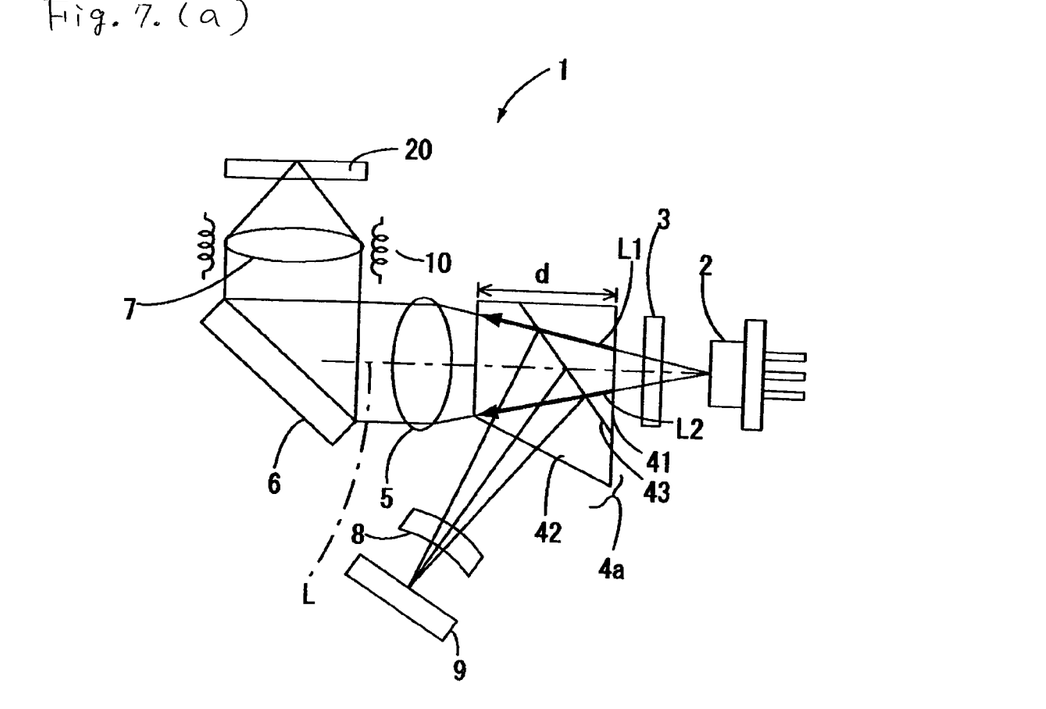

All of the embodiments previously described used a cubic type prism 4 produced by joining first prism component 41 and second prism component 52 having a right-angled isosceles triangle prism configuration as an example. However, the present invention may be applied to prism 4a of another configuration having partial reflection plane 43 at an angle other than 45 degree to the optical axis L of the laser beam emitted from laser emitting element 2 as illustrated in FIG. 7 (*a*). Alternatively, a polarized separation membrane, a half-mirror film, phase-contrast film, and the like may be provided between first prism component 41 and second prism component 42.

Also, as illustrated in FIG. 7 (*b*), the present invention may be applied to a method of manufacturing composite prism 4b used for dual wavelength optical head apparatus 1a having first laser emitting element 21 that emits a laser beam of 650 nm and second laser emitting element 22 that emits a laser beam of 780 nm in order to record and reproduce data on optical data storage media 20 such as a DVD or CD.

INDUSTRIAL USEFULNESS

The present invention recognizes the fact that when a laser beam passes through a prism as a bundle of divergent light rays, a first ratio defined by the length of the optical path of the first prism component to the length of the entire optical path of the laser beam and a second ratio defined by the length of the optical path of the first prism component to the length of the entire optical path of the laser beam will deviate depending on the point of the prism through which the laser beam passes, and equalizes the refractive indices of a first prism component and a second prism component to produce a prism. Therefore, according to the present invention, the optical path lengths will be identical, or the difference in length will be substantially small. Accordingly, astigmatism may be absent or present only at a low level. In this prism, even when a difference in refractive index exists between the first and second prism components, it is known which prism component has a higher refractive index from the way the prism is made. The direction in which astigmatism is generated by a prism is therefore predictable. As a result, an optical system can be configured according to the direction of the astigmatism generated by the prism. The problem of the astigmatism generated by the prism is thus resolved.

While the foregoing description and drawings represent the present invention, it will be obvious to those skilled in the art that various changes may be made therein without departing from the true spirit and scope of the present invention.

FIG. 1 FIG. 2
astigmatism
difference in refractive index
FIG. 3(*a*) FIG. 3(*b*) FIG. 3(*c*)
FIG. 4(*a*) FIG. 4(*b*) FIG. 4(*c*)
FIG. 4(*d*) FIG. 4(*e*) FIG. 4(*f*) FIG. 4(*g*)
FIG. 5(*a*) FIG. 5(*b*) FIG. 5(*c*) FIG. 5(*d*)
FIG. 6(*a*) FIG. 6(*b*) FIG. 6(*c*) FIG. 6(*d*)
FIG. 6(*e*) FIG. 6(*f*) FIG. 6(*g*) FIG. 6(*h*)
FIG. 7(*a*) FIG. 7(*b*)

What is claimed is:

1. A method of producing a prism comprising a first prism component and a second prism component that are joined together along a partial reflection plane that is inclined with respect to the optical axis wherein said method has steps comprising:

measuring the refractive index of three or more multiple base materials which are used as said first prism component and said second prism component to obtain respective values of the refractive index of three or more base materials; and joining the three or more of said base materials together along partial reflection planes to construct a laminated body with said three or more base materials according to the values of said refractive index so that the values of said refractive index are arranged in an incremental or decremental manner; and then cutting said laminated body to obtain the prism comprising the first prism component and the second prism component, thereby producing a plurality of prisms.

2. The method of producing a prism according to claim 1, further comprising:

cutting a large starting base material capable of producing a first prism component and a second prism component to obtain the three or more base materials.

3. The method of producing a prism according to claim 1, wherein when three or more of said base materials are joined together along the partial reflection planes, the three or more of said base materials are joined in which a difference between the values of said refractive index of two adjacent base materials satisfies the following inequality:

$$-0.001 < \Delta n < 0.001$$

Where $\Delta n$ is the difference between the values of said refractive index.

* * * * *